United States Patent [19]

Hartness

[11] Patent Number: 4,857,090
[45] Date of Patent: Aug. 15, 1989

[54] ENERGY CONSERVATION SYSTEM FOR COOLING AND CONDITIONING AIR

[75] Inventor: Roy Hartness, Mount Holly, N.C.

[73] Assignee: Pneumafil Corporation, Charlotte, N.C.

[21] Appl. No.: 159,220

[22] Filed: Feb. 23, 1988

[51] Int. Cl.$^4$ .............................................. F25D 17/02
[52] U.S. Cl. .......................................... 62/91; 62/121; 62/171; 261/130; 261/131; 261/147; 261/149
[58] Field of Search ........................... 62/91, 121, 171; 261/130, 131, 147, 149

[56] References Cited

U.S. PATENT DOCUMENTS

| 3,861,164 | 1/1975 | Brown | 62/91 |
| 4,380,910 | 4/1983 | Hood et al. | 62/91 |
| 4,616,777 | 10/1986 | Fisher et al. | 62/171 |

OTHER PUBLICATIONS

*Trane AC Manual*, Trane Co., La Crosse, Wisconsin, pp. 223–226, 1965.

Primary Examiner—Albert W. Davis, Jr.
Attorney, Agent, or Firm—Shefte, Pinckney & Sawyer

[57] ABSTRACT

An energy conservation system for cooling and conditioning air, particularly air at elevated temperatures which is discharged from the rotors of open-end spinning machines. The air is directed along a predetermined flow path in which a first stage cooling zone is established, which utilizes one or more cooling coils through which flow a heat exchange fluid that is cooled by an externally located cooling tower. The system includes a second stage cooling zone comprising an air washer in which water is sprayed into the air stream, such water being chilled in part by a mechanical refrigeration unit. The air washer preferably includes two spray pipes, one being located upstream of the other, with the downstream spray pipe receiving some liquid chilled by the refrigeration unit, and with the upstream spray pipe receiving its spray liquid from the discharge collected from the downstream spray pipe.

9 Claims, 2 Drawing Sheets

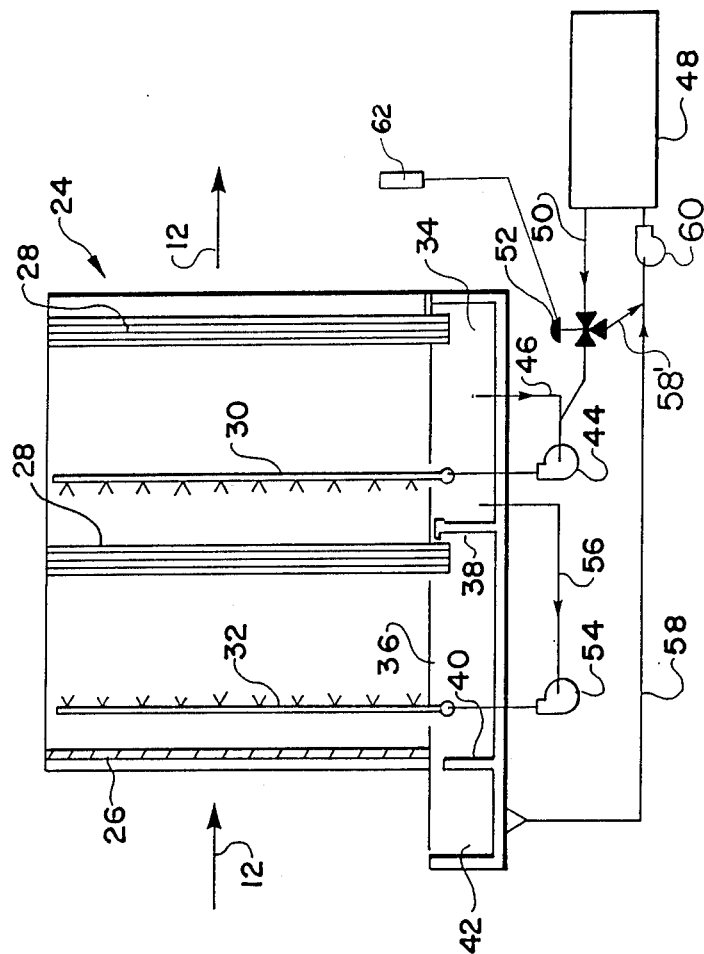

ENERGY CONSERVATION SYSTEM FOR COOLING AND CONDITIONING AIR

BACKGROUND OF THE INVENTION

The present invention relates generally to systems for cooling and conditioning room air, and has particularly advantageous applications in textile mills and similar environments where the air temperature and/or humidity are higher, even significantly higher, than usual.

In the textile field, open-end spinning machines are becoming a dominant force in textile spinning operations. These open-end spinning machines include rotors and they are disposed to pull a significant quantity of room air through these rotors as part of the spinning process, and this air is exhausted back into the room, but only after its temperature has been increased dramatically during its passage through the rotors. In some typical open-end spinning machines, approximately 12–13 CFM of air is pulled through each rotor, and this air is heated approximately 48° F., so that in a machine having 216 rotors, approximately 2700 CFM of air at a temperature of approximately 124° F. is exhausted back into the room where the spinning machines are operating.

It is well-known that precise room conditions are required for producing spun yarn from open-end spinning machines, and the room temperature is usually maintained within the range of 74°–80° F. and relative humidity is maintained within the range of 58–62%.

It is a common pratice to capture the air discharged from open-end spinning machines, exhaust it to the outside, and intake an equivalent amount of cooler outside air through the air conditioning apparatus to reduce the energy consumption of the air conditioning system. While this practice is a somewhat effective energy reduction tactic, the air conditioning system must nevertheless be designed for a maximum peak refrigeration capacity that can handle the cooling and conditioning loads even in the most difficult hot and humid summer months when the enthalpy of the outside air is close to the enthalpy of the discharge air from the open-end spinning machines. This practice also at times creates an imbalance in exhausted air and intake air through the air conditioning apparatus and can cause infiltration of outside air directly into the conditioned spinning area, thereby adversely affecting the room conditions which must be maintained within close tolerances for optimum yarn production.

One of the most common conventional air conditioning systems used in textile mills is an air washer system in which air is taken from the room in which equipment is operating, and a portion of this air may be exhausted to the outside and the remainder mixed with incoming air from the outside as return air, such outside air being used only when it will reduce the required cooling and conditioning load imposed on the system. This return air is circulated through an air washer device where water is sprayed directly into the moving air simultaneously through one or more spray pipes to cool and/or control the humidity of the air. Sprayed water is collected in a reservoir and recycled by a pump to the spray pipe, and the inlet of this recycling pump is usually connected also to a source of chilled water with a control valve being used to vary the ratio of chilled water and recycled water fed to the pump inlet, the control valve operating in response to the sensed temperature of the conditioned air. The chilled water is cooled prior to its being fed to the inlet of the circulation pump by a conventional mechanical refrigeration unit that usually operates in conjunction with a cooling tower that is used as the final means of heat rejection.

The aforesaid conventional air washer systems have a cooling efficiency of about 80–90%, and while they can be designed or modified to provide the aforesaid significantly increased cooling and conditioning capacity required by the demands of open-end spinning operations, the capital costs are substantially increased by the additional mechanical refrigeration that is required and, importantly, the energy consumption and operating costs of the system as a whole are increased significantly because of the additional refrigeration equipment.

In accordance with the present invention, a cooling and conditioning system is provided which requires less refrigeration equipment to maintain the same room conditions as conventional systems, thereby resulting in a significant reduction in energy use and operating costs.

SUMMARY OF THE INVENTION

Briefly summarized, the present invention provides an energy conservation system for cooling and conditioning heated air, such as air exhausted from the rotors of open-end spinning machines at highly elevated temperatures (e.g. approximately 124° F.) This heated air is moved along a flow path in which a first stage cooling unit is placed, such first stage including one or more cooling coils over which the air passes for cooling by a lower temperature heat transfer fluid that is continuously circulated in a closed loop through the cooling coils and through a cooling tower where the heat transfer fluid is exposed to outside ambient temperatures. After passing over these cooling coils and being cooled to a predetermined temperature level, the air is moved through a second stage cooling unit that is located downstream of the first cooling stage, and that includes an air washer unit in which chilled water is continuously spayed into the moving air to further reduce its temperatures to a second predetermined temperature level.

The air washer unit preferably includes two spray pipes with the second spray pipe being located upstream of the first spray pipe in the flow path of the air. Sprayed water is collected separately in reservoirs or the like a both spray pipes for circulation, and the water collected at the first spray pipe is pumped into the first spray pipe and sprayed into the air after it has been mixed, if necessary, with a predetermined quantity of water that has been mechanically chilled by a refrigeration unit. The water collected at the first spray pipe is also pumped into the second spray pipe and sprayed into the air, and the water collected at the second spray pipe is pumped to the refrigerating unit for chilling before it is recirculated to the first spray pipe. The quantity of the chilled water that is mixed with the accumulated spray washer collected at the first spray pipe is controlled by a control valve that is responsive to the sensed temperature of the air being cooled or of the room into which the conditioned air is directed.

It will be noted that in the system of the present invention the air at its highly elevated temperature (e.g. approximately 124° F.) is initially cooled substantially (e.g. to about 95° F.) by a first stage that uses only a cooling tower rather than a refrigeration unit with is high operating costs. Additionally, in the second cooling stage, the chilled water is first sprayed into the air at a downstream location where the air temperature is at a lower level that may require chilled water for cooling, and the chilled water, after being sprayed from the first spray pipe, is then re-circulated through the second spray pipe upstream of the first spray pipe where the air temperature is higher and maximum advantage is obtained from the chilled water even though it has been heated during spraying at the first spray pipe.

Thus, the present invention provides a very efficient system for cooling and conditioning air, particularly air at very elevated temperatures, that reduces significantly the operating costs usually associated with conventional cooling and conditioning systems.

BRIEF DESCRIPTION OF THE DRAWINGS

FIG. 2 is a diagrammatic side elevational view of the air washer unit of the system illustrated in FIG. 1.

DESCRIPTION OF THE PREFERRED EMBODIMENT

Figure 1:
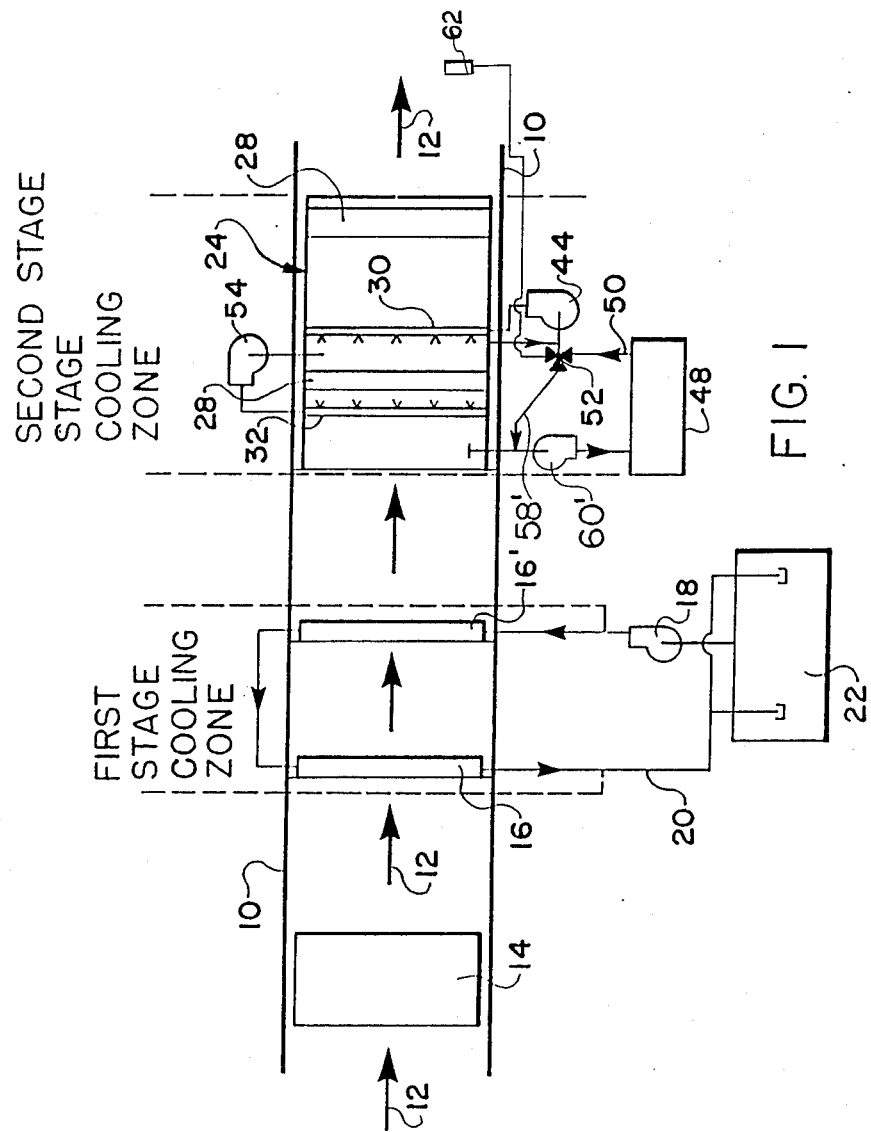
FIG. 1 is a diagrammatic plan view of the cooling and conditioning system of the present invention.

Looking now in greater detail at the accompanying drawings, FIG. 1 illustrates in diagrammatic form the arrangement of components constituting the energy conservation system for cooling and conditioning air provided by the present invention. Air at substantially elevated temperatures, such as the above-described air exhausted from the rotors of open-end spinning machines, is introduced into the system at the left-hand end and is moved by fans or the like (not shown) through a conduit or passageway 10 which establishes an enclosed predetermined flow path for the air, the air movement through the passageway 10 being indicated by the flow arrows 12. The air first passes through a conventional filter 14 which removes foreign matter, such as lint, from the air, after which the air passes through a first stage cooling zone which comprises one or more, and preferably at least two, conventional cooling coils 16,16' arranged serially in the passageway 10 so that the high temperature air passes over the upstream cooling coil 16 and then passes over the downstream cooling coil 16'. While two cooling coils 16,16' are illustrated in FIG. 1, it will be understood that the number of cooling coils employed may vary depending on the demands of the system, the size of the cooling coils themselves, and other known variables.

The high temperature air passes over the exterior surfaces of the cooling coils 16,16' in a typical heat exchange relationship, and a heat exchange fluid, such as water, is continually circulated through the interior of the cooling coils 16,16' by a circulation pump 18 and appropriate conduits 20 which establish a closed loop circulation system between the cooling coils 16,16' and a conventional cooling tower 22. As is well-known, the cooling tower would normally be located so that it is exposed to outside ambient temperature, such as on the roof of a textile mill. Thus, as indicated in FIG. 1, the circulation pump 18 withdraws the heat exchange fluid which has been cooled by exposure to outside ambient air in the cooling tower 22 and directs the cooled heat exchange fluid through the downstream cooling coil 16', after which it is directly circulated through the upstream cooling coil 16, and finally returned to the cooling tower 22 where it is re-cooled by exposure to outside ambient air. It will be noted that the heat exchange fluid which has been cooled by the cooling tower, and therefore is at its lowest temperature, is first circulated through the downstream cooling coil 16' where the air temperature is less than at the upstream cooling coil 16 because of the cooling effect of the air passing over the upstream cooling coil 16, whereby a relatively high temperature differential exists between the temperature of the air and the temperature of the cooled heat exchange fluid in the downstream cooling coil 16', and improved heat transfer efficiency is obtained based upon known heat exchange principles. Similarly, efficiency at the first stage is improved by directing the heat exchange fluid, which has been somewhat raised in temperature by virtue of its passage through downstream cooling coil 16', through the upstream cooling coil 16, where the air temperature is greater and improved heat transfer results.

After the air has been cooled in the first stage, it passes into a second stage cooling zone which includes an air washer 24 that is diagrammatically illustrated in greater detail in FIG. 2. The inlet or upstream end of the air washer 24 includes a conventional louvered baffle 26 that prevents backsplash of water and mist from the air washer 24, and a pair of conventional moisture eliminating baffles 28 are also provided, one being located between the two spray pipes to be described in greater detail below, and one being located at the exit or downstream end of the air washer 24, these moisture eliminating baffles serving to mechanically capture large droplets of water which are entrained in the air flow through the air washer 24. As best seen in FIG. 2, the air washer 24 includes a first vertically extending spray pipe 30 located downstream of a second spray pipe 32, it being understood that the spray pipes 30 and 32 are diagrammatically illustrated and could constitute a bank or plurality of actual pipes, again depending on the design parameters of the system and the demands imposed on the system. A first reservoir 34 is located beneath the first spray pipe for collecting most of the water sprayed from the first spray pipe 30, and a second reservoir 36 is similarly positioned beneath the second spray pipe 32. The two reservoirs are separated from one another by a weir divider wall 38 which acts to maintain the two reservoirs 34 and 36 as separate bodies of water, but provides overflow protection in the event the water should rise too high in the first reservoir 34. Another smaller weir divider wall 40 is provided between the second reservoir 36 and a re-circulation chamber 42.

The water which is discharged from the spray pipes 30, 32 is circulated in essentially a closed loop system that includes a first circulation pump 44 having its inlet or suction side connected to the first reservoir 34 by a conduit 46 and also connected, in a manner to be described in greater detail presently, to the discharge side of a refrigeration unit 48 through a conduit 50 that includes a control valve 52. Water sprayed from the upstream spray pipe 32 is circulated by a second circulation pump 54 having its inlet or suction side connected to the first reservoir 34 by an inlet conduit 56. Finally, a conduit 58 extends from the re-circulation chamber 42 to the refrigeration unit 48, and the flow through conduit 58 is caused by pump 60. The refrigeration unit 48 is conventional refrigeration equipment which employs a refrigerant or gaseous medium having a low boiling, such as freon, for mechanically chilling the water that is circulated through the refrigeration unit 48. As is well known, the use of a refrigerant for mechanically chilling the water can significantly lower the temperature of the water circulated therethrough, even to temperature levels substantially below ambient, and therefore a substantially larger degree of cooling of the circulated water can be obtained from a refrigeration unit as opposed to a cooling tower of the type used in the first stage cooling zone of the present invention, but it is significant that the energy consumption of a refrigeration unit is substantially greater than that of a cooling tower. The quantity of chilled water which is supplied to the suction side of the first circulating pump 44 is regulated by the control valve 52, which is a conventional control valve used in air washers and which is automatically actuated by sensor 62 to control the temperature of the air passing through the air washer, whereby the control valve will move in a open direction and permit more chilled water to flow to the first circulation pump 44 as the conditioned air or room air temperature rises, and will move in a manner to cause some or all of the water to be by-passed through line 58' to the inlet of refrigeration unite 48 to reduce the amount of chilled water supplied when the sensed air temperature falls. It should also be noted that it is conventional practice to utilize a cooling tower in conjunction with refrigeration units such as unit 48 of the present invention. Where the first and second stage cooling zones of the present invention are located in close proximity to one another, the same cooling tower 22 can be utilized with the refrigeration unit 48 and the cooling coils 16,16'. In other applications where such close proximity does not exist, a separate cooling tower may be provided for the refrigeration unit 48.

The unique cooling and conditioning system of the present invention, as described above, utilizes several avenues for conserving energy, while still providing the necessary cooling capacity even for air whose temperatures have been substantially elevated, such as by the aforesaid passage through the rotors of open end spinning machines where the temperature of the exhaust air may be approximately 124° F. First, it will be noted that this very hot air is moved through a first stage where it is passed over cooling coils 16,16' and where a heat exchange relationship is established with water that is coöled by a low energy consumption cooling tower 22. Even though the temperature of the water cooled by the cooling tower 22 is relatively high (e.g. approximately 85° F.) as compared to water that has been mechanically chilled by refrigeration, it will be noted that there is a substantial temperature differential between the heated air entering the first stage cooling zone and the temperature of the water circulated from the cooling tower 22, and accordingly to conventional heat exchange principles, this will result in a substantial reduction in the temperature of the air by the use of the low energy cooling tower 22. Also, as explained above, by circulating the cooling tower water through the downstream cooling coil first and then through the upstream cooling coil, cooling efficiency is increased. It is therefore believed, based on existing data, that a reduction in the temperature of the air can be reduced efficiently in the first stage cooling zone from approximately 124° F. to approximately 95° F.

This partially cooled air then enters the air washer 24 where more energy conservation is obtained. It will be noted that any chilled water aditted into the system by control valve 52 is first sprayed through the downstream spray pipe 30 where the low temperature of the sprayed water will have a maximum heat exchange effect on the air which has already passed through the first cooling stage zone and the upstream spray pipe 32. Moreover, the chilled water sprayed from the downstream spray pipe 30 is collected in the first reservoir 34 where it is re-circulated through the downstream spray pipe 30 by the first circulation pump 44, and it is also circulated directly to the upstream spray pipe 32 by the second circulation pump 54, all before the water is returned to the refrigeration unit 48. Thus, the chilled water, which requires the most significant energy consumption to obtain, is introduced into the system at the downstream end where it is most effective from a heat transfer standpoint, and rather than simply re-circulating the collected water back to the refrigeration unit 48, the chilled water, albeit somewhat higher in temperature because of its exposure to the air passing through the spray from the downstream pipe 30, nevertheless has a temperature that is sufficiently low to obtain further reduction in the air temperature when it is re-circulated through the two spray pipes. By way of example, if the air entering the second cooling stage zone is 95° F. as indicated above, the chilled water leaving the refrigeration unit 48 will be approximately 48° F. and the temperature of the water in the first reservoir 34 will be approximately 60° F., and the temperature in the second reservoir 36 will be approximately 67° F. It will therefore be appreciated that the water at 60° F. which is sprayed from the upstream spray pipe 32 will have a significant cooling effect on the 95° F. air entering the second stage cooling zone, and the lower temperature water sprayed from the downstream spray pipe 30 will likewise cause a final cooling of the air to reduce it to a temperature that is acceptable for textile operations.

Because of the efficiencies and energy conservation features of the present invention, significant reductions in mechanical refrigeration capacity and operating costs can be realized, as compared with conventional air washer systems of the type described above, particularly in modern textile plants using a substantial number of open end spinning machines which generate significant amounts of heat that is applied to the air passing therethrough. For example, in a typical open-end spinning room operation utilizing 17,280 rotors, it is expected that refrigeration capacity can be reduced by as much as 559 tons, depending on outside design wet bulb temperatures at the textile mill. Apart from this savings in capital expenditures, which will be offset by the additional cooling costs and other components required by the present invention, it is believed that typical operating costs may be reduced by as much as 100,000.00 in a twelve month period where the spinning room would operate for approximately 6,000 hours during such period.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and equivalents thereof.

I claim:

1. An energy conservation system for cooling and conditioning air, said system comprising:
   (a) means for directing air along a predetermined flow path;
   (b) cooling coil means disposed in said flow path so that said air flows over the external surfaces of said cooling coils means, said cooling coil means having a heat exchange fluid passing internally thereof;
   (c) cooling means associated with said cooling coil means for cooling said first heat exchange fluid by exposing it to a cooling medium having a temperature less than the temperature of said first heat exchange fluid;
   (d) circulating means for circulating said heat exchange medium through said cooling coil means and said cooling means;
   (e) air washer means located in said flow path downstream of said cooling coil means and having spray means for spraying water into said moving air, said air washer spray means including a first water spray pipe and a second water spray pipe located upstream of said first spray pipe, first collector means for collecting water sprayed from said first water spray pipe, and first pump means for delivering water from said first collection means to said first and second water spray pipes for spraying therefrom; and
   (f) refrigerating means for mechanically chilling water and delivering said chilled water to said air washer means for spraying therefrom into said moving air, and means for selectively mixing said mechanically chilled water with said water delivered from said first collection means to said first and second water spray pipes.

2. An energy conservation system as defined in claim 1 and further characterized in that said air washer means includes second collection means for collecting water sprayed from said second water spray pipe, and second pump means for delivering to said water from said second collection means to said refrigerating means for chilling.

3. An energy conservation system as defined in claim 2 and further characterized in that mixing means is provided to cause said chilled water delivered by said refrigerating means to be mixed with said water delivered from said first collection means to said first water spray pipe.

4. An energy conservation system as defined in claim 3 and further characterized in that control means is provided for sensing the temperature of said air and regulating the amount of chilled water mixed with said water delivered to said first water spray pipe as a function of said sensed air temperature.

5. An energy conservation system as defined in claim 1 and further characterized in that said cooling coil means includes a first cooling coil and a second cooling coil located upstream of said first cooling coil, and in that said circulating means delivers fluid in a closed loop from said cooling means to said first cooling coil, from said first cooling coil to said second cooling coil, and from said second cooling coil to said cooling means.

6. An energy conservation system for cooling and conditioning air exhausted from the rotors of open-end spinning machines located within a building, said system comprising:
   (a) conduit means for delivering air from said rotors along an enclosed predetermined flow path and returning said air to the space in said building in which said open-end spinning machines are located;
   (b) first stage cooling means disposed in said flow path for cooling said air and including at least one cooling coil having an exterior surface over which said air is passed, said cooling coil having a heat exchange fluid passing internally thereof;
   (c) cooling tower means located outside of said building for cooling said heat exchange fluid by exposing it to ambient temperatures;
   (d) first circulating means for circulating said heat exchange fluid between said first stage cooling means and said cooling tower means in a closed loop;
   (e) air washer means located in said flow path downstream of said cooling coil means, said air washer having first and second spray pipes through which water is sprayed into said air moving along said flow path, said second spray pipe being located upstream of said first spray pipe, and said air washer means including first and second collection means for collecting water sprayed from said first and second spray pipes, respectively;
   (f) refrigerating means for mechanically chilling water;
   (g) second circulating means for delivering a combined flow of chilled water from said refrigerating means and collected water from said first collection means to said first spray pipe, from said first collection means to said second spray pipe, and from said second collection means to said refrigerating means; and
   (h) control means for sensing the temperature of the air within said room and regulating the ratio of said chilled water and said collected water delivered to said first spray pipe as a function of said sensed air temperature.

7. A method of cooling and conditioning air while conserving energy, said method comprising the steps of:
   (a) moving heated air along a predetermined flow path;
   (b) providing a first cooling stage in said flow path at which said heated air is cooled to a predetermined first temperature level by being passed over at least one cooling coil;
   (c) circulating a heat exchange fluid through said cooling coil after it has been cooled by exposure to a cooling medium having a temperature less than the temperature of said heat exchange fluid;
   (d) providing a second cooling stage in said flow path downstream of said first cooling stage, said second cooling stage cooling said air from said predetermined first temperature level to a predetermined second temperature level by spraying water into said moving air at a first location and a second location upstreamm of said first location, and collecting the sprayed water at said first location;
   (e) circulating at least a portion of said collected water through refrigeration means to mechanically chill said water, mixing said chilled water with said water collected at said first location, and recirculating said mixed water to said first and second locations for spraying therefrom.

8. A method of cooling and conditioning air as defined in claim 7 and further characterized by the step of sensing the temperature of said air and regulating the amount of said chilled water that is mixed with said collected water as a function of said sensed air temperatures.

9. A method of cooling and conditioning air as defined in claim 7 and further characterized in that said moiving air is cooled from a temperature level above 120° F. to a temperature level in the range of 90°–100° F. at said first stage, and is further cooled to a temperature level in the range of 60°–65° F. at said second stage.

* * * * *